United States Patent [19]

Inoue et al.

[11] Patent Number: 4,626,645

[45] Date of Patent: Dec. 2, 1986

[54] AUTOMATIC TW ELECTROEROSION MACHINING SYSTEM

[75] Inventors: Kiyoshi Inoue, Tokyo; Akihiko Shimizu, Kanagawa, both of Japan

[73] Assignee: Inoue-Japax Research Incorporated, Kanawaken, Japan

[21] Appl. No.: 650,293

[22] Filed: Sep. 12, 1984

[30] Foreign Application Priority Data

Sep. 12, 1983 [JP]  Japan ................. 58-166599

[51] Int. Cl.⁴ .............................................. B23H 7/00
[52] U.S. Cl. .................................. 219/69 W; 29/564; 204/129.1; 204/224 M; 219/69 R; 219/69 M
[58] Field of Search ................ 29/564; 219/68, 69 R, 219/69 M, 69 V, 69 W; 204/129.1, 129.2, 224 M

[56] References Cited

U.S. PATENT DOCUMENTS

| | | | |
|---|---|---|---|
| 3,435,498 | 4/1969 | Lewry | 29/564 |
| 3,479,479 | 11/1969 | O'Connor | 219/69 W |
| 3,762,035 | 10/1973 | Ledergerber et al. | 29/558 |
| 3,822,374 | 7/1974 | Ullmann et al. | 219/69 W |
| 4,158,761 | 6/1979 | Wittenstein | 219/69 E |
| 4,369,563 | 1/1983 | Williamson | 29/564 |
| 4,379,959 | 4/1983 | Inoue | 219/69 M |
| 4,454,645 | 6/1984 | Schissler | 29/564 |
| 4,483,755 | 11/1984 | Heck et al. | 204/129.1 |

FOREIGN PATENT DOCUMENTS

| | | |
|---|---|---|
| 3021669 | 1/1981 | Fed. Rep. of Germany . |
| 3205884 | 9/1982 | Fed. Rep. of Germany . |
| 119327 | 9/1981 | Japan .................. 219/69 M |
| 157927 | 12/1981 | Japan .................. 219/68 |
| 107759 | 7/1982 | Japan .................. 29/564 |
| 184633 | 11/1982 | Japan .................. 219/69 W |
| 211422 | 12/1982 | Japan .................. 219/69 W |

Primary Examiner—Clarence L. Albritton
Assistant Examiner—Geoffrey S. Evans
Attorney, Agent, or Firm—Karl F. Ross; Herbert Dubno

[57] ABSTRACT

An automatic TW (traveling-wire) electroerosion machining system for machining a plurality of workpieces of different types required to acquire different contours includes a TW machine having a wire setting unit and located adjacent a predetermined path. A work dispensing unit successively dispenses the different workpieces onto the path from a store thereof located adjacent the path. This unit and a work handling and transfer unit operate under control commands from an NC unit and, in conjunction with the TW machine, with the wire setting unit to carry out a plurality of work processing operations sequentially. In each operation, each individual workpiece selected from the store is transferred as it is carried on a pallet for loading onto and unloading from the TW machine. The tank of the TW machine has a movable front wall to facilitate this operation. The electrode setting unit on the machine acts both to form a start hole and thread a wire-type electrode through the formed hole in the workpiece. The unloaded workpieces are transferred to an inspection stage for classification into acceptable and unacceptable products.

1 Claim, 1 Drawing Figure

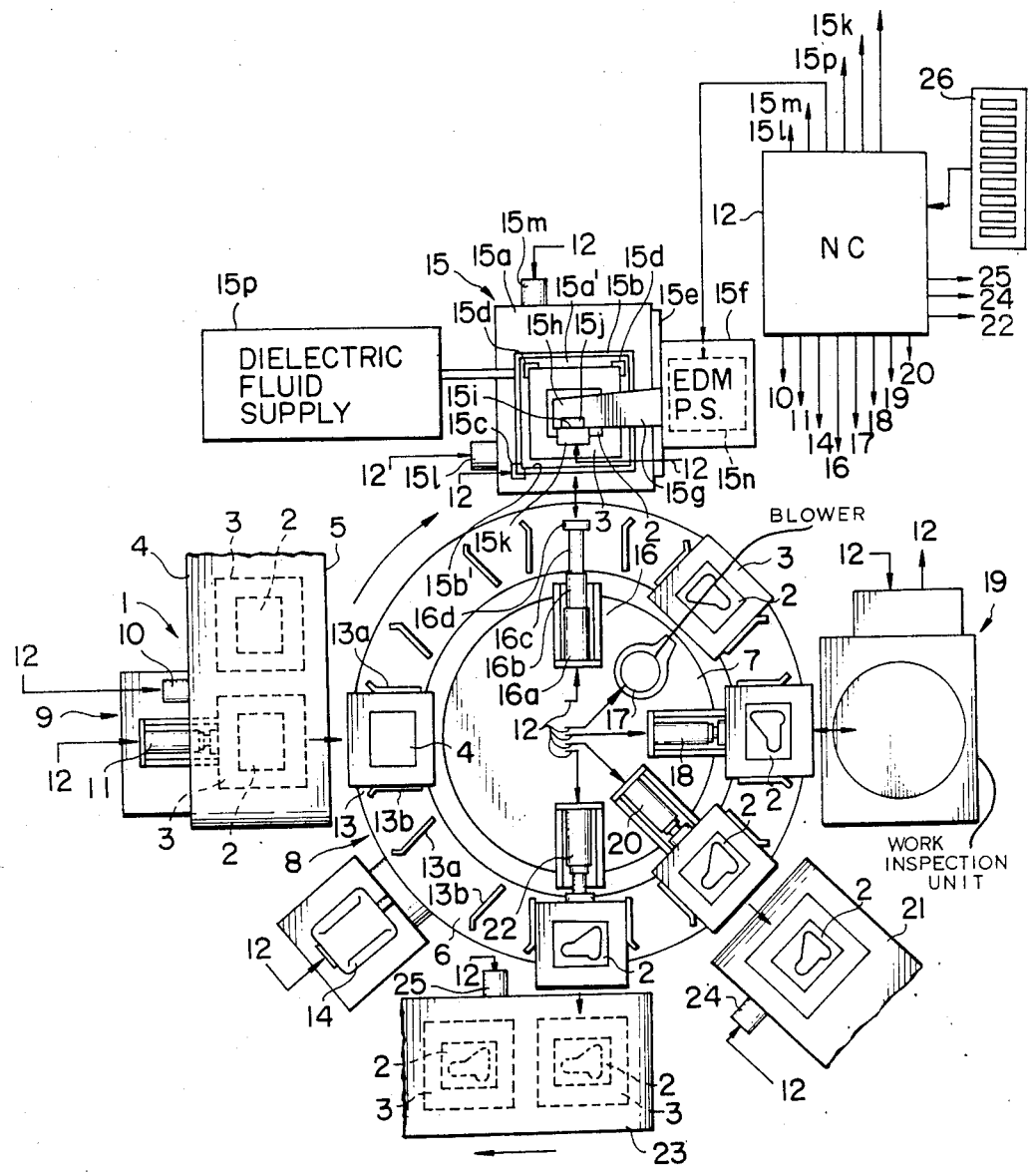

AUTOMATIC TW ELECTROEROSION MACHINING SYSTEM

FIELD OF THE INVENTION

The present invention relates to a traveling-wire (TW) electroerosion machining system or installation and, more particularly, to such a system or installation capable of automatically producing a variety of machined products with a variety of contours consecutively from a like variety of blank workpieces.

BACKGROUNDS OF THE INVENTION

It is well known that a TW electroerosion machine is highly suitable for imparting an intricate contour with high machining accuracy to a workpiece, and thus for producing, e.g. dies and molds with severe tolerance requirements. These products have their own particular specifications as demanded to meet their own particular purposes so that each must be prepared from a relative expensive blank workpieces and yet be machined individually with an extremely high degree of machining precision.

While a TW electroerosion machine, especially when designed to operate under numerical control, has proven capable of machining such a contour even of highly complex geometry with precision automatically and more efficiently than any other conventional machine, it has been found that the existing TW machine requires skillful attendance by the operator to the machine before and after the machining is carried out in the machine, and is far less than inefficient where a variety of contoured products are to be consecutively manufactured from different workpiece blanks. Such blanks require not only different machining programs but different attendant operations with respect to both work handling and machine setting. In addition, a peculiarity of the TW process has required of each separate and independent blank workpiece a start hole to allow threading by a wire electrode to initiate electroerosion. As the machining contour differs from one workpiece to another, the start hole differs in position and requires separate positioning programs to be executed for different machining operations. Thus, the existing TW machines have been far removed from a full-automatic capability in processing a plurality of workpieces of different types required to acquire different prescribed contours.

OBJECTS OF THE INVENTION

Accordingly, the present invention seeks to provide a TW electroerosion machining system or installation which is capable of consecutively TW-machining a plurality of workpiece of different types on a fully automatic basis to produce the products with different prescribed contours.

SUMMARY OF THE INVENTION

In accordance with the present invention there is provided a TW (traveling-wire) electroerosion system for machining a plurality of workpieces of different types required to acquire different contours, which system comprises: a store adjacent a predetermined path and having a plurality of separate seats for storing unmachined workpieces of different types; work dispensing means associated with the store and having a first set of operating units operable under control commands to successively dispense the different workpieces from the respective seats in a prescribed order onto the said path; a TW machine located adjacent the said path and having a second set of operating units operable under control commands for electroerosively machining each of the dispensed workpieces from the said path by means of a traveling wire-type electrode; electrode setting means associated with the said machine and having a third set of operating units operable under control commands for machining a start hole and automatically threading the wire-type electrode therethrough in the workpiece to initiate the TW-electroerosion thereof; work handling and transfer means having a fourth set of operating units operable under control commands for transferring the workpiece along the said path, and loading the workpiece from the path onto the said machine and unloading the workpiece from the machine onto the said path; and control means connected with the said first, second, third and fourth sets of operating units for operating the said work dispensing means, the said the TW machine, the said electrode setting means and the said work handling and transfer means to sequentially execute the plurality of work processing operations which are equal in number to the number of the workpieces and, in each of the processing operations, for selecting a particular one of the workpieces from the corresponding seat in the said store according to the said prescribed order to dispense it onto the said path, transferring the dispensed workpiece along the said path, loading it on the said machine, positioning the loaded workpiece to establish therein relative to the axis of the wire-type electrode a particular position of the starting hole from which to start the TW-electroerosion, forming the said start hole in the workpiece at the said particular position and threading the wire-type electrode through the said hole, axially advancing the threaded electrode, effecting relative displacement, while effecting stock removal, between the workpiece and the advancing electrode along a particular path programmed to generate the prescribed contour in the said particular workpiece, and unloading the machined workpiece from the said machine onto the said path.

BRIEF DESCRIPTION OF THE DRAWING

The sole FIGURE of the drawing is a diagrammatic top plan view illustrating a system embodying the present invention.

SPECIFIC DESCRIPTION

The system shown includes a store 1 of a plurality of conductive blank workpieces 2 which are of different types, e.g. of different materials, thicknesses and/or areas. The workpiece 2 are here securely carried by pallets 3 which are securely but detachably positioned in seats 4 provided on a conveyer 5. The conveyer 5 is disposed adjacent a rotary conveyer or carriage 6, which is arranged as turnable around a round table 7 which is fixed in position. The carriage 6 forms a part of a work handling and transport mechanism 8 to be described.

Associated with the store 1 is a work dispensing apparatus 9 which comprises a motor 10 drivingly coupled with the conveyer 5 and a hydraulic or pneumatic actuator or feeder 11 adapted to be drivingly engaged with each pallet 3 on the conveyer 5. The motor 10 and the feeder 11 are designed to operate under control commands from a control unit 12, e.g. a numerical controller (NC), to successively dispense the pallets 3 and thus the workpiece 2 as they are carried thereby, from the respective seats 4 on the conveyer 5 onto the conveyer 6 in a programmed order. Thus, the motor 10 operates to drive the conveyer 5 to bring a particular pallet 3 designated by the program in front of the feeder 10 which then operates to feed this pallet 3 onto the conveyer 6.

The conveyer 6 has a plurality of seats 13 each defined by a pair of guide members 13a, 13b for accepting the pallet 3 fed from the conveyer 5 to hold it firmly in position on the conveyer 6. A motor 14 is drivingly coupled with the rotary conveyer 6 and operates under control commands from the NC unit 12 to turn the conveyer 6 by a programmed angle such as to bring the pallet 3 with the workpiece 2 adjacent a TW machine 15 and in front of work loading and unloading actuator 16 of a hydraulic or pneumatic type having a base portion 16a securely supported on the round table 7.

The TW machine 15 is provided with a horizontal worktable 15a movably mounted on a base 15e to situate at a height below that of the conveyer 6. Securely mounted on the worktable 15a adjacent the conveyer 6 is a worktank 15b comprising four vertical plates arranged to form a square or rectangular box-like receptacle with the top open and the floor 15a' constituted by a portion of the worktable 15a. The frontal one 15b' of these vertical plates is arranged to be operable by being slid up by a mechanism 15c to accept the pallet 3 loaded with the workpiece 2. The mechanism 15c has a drive unit (not shown) operably connected with the NC unit 12. The worktank 15b is provided with jig members 15d vertically standing on and secured to the floor 15a' for receiving and retaining the pallet 3 from the conveyer 6 firmly in position. The jig members lie at a level above the floor 15a' and at the same height as the conveyer 6.

The work loading and unloading actuator 16 comprises a cylinder 16b supported by the base portion 16a and a piston 16c slidably received in the cylinder 16b as projectable therefrom towards the worktank 15b. The piston 16c has a disk head 16d for engagement with the pallet 3 when brought in front thereof. Under control commands from the NC unit 12, when the motor 14 has turned the conveyer 6 by the commanded angle, the mechanism 12 is operated to slide up the front plate 15b' of the worktank 15d and the actuator 16 is operated to push the pallet 3 and slide it off the conveyer 6 into the opened worktank 15b, thus loading the workpiece 2 loaded in the pallet 3 at the programmed position on the worktable 15a of the TW workpiece 15. Subsequently, again under control commands from the NC unit 12, the actuator 16 is operated to retract the piston 16b to its original position in the cylinder 16c and the mechanism 15c operated to slide the front door 15b' down to close the worktank 15b.

The TW machine 15 according to a standard design has a column 15f standing upright on the base 15e and an arm 15g horizontally extending from the column 15f. The arm 15g carries at its end portion a head member 15h which overlies the workpiece 2. Typically, a further arm (not seen) is provided which extends horizontally from the column 15f to pass into the worktank 15b and to lie below and parallel to the arm 15g above the floor 15a'. A wire-type electrode 15i dispensed from a supply reel (not shown) is shown as passing through a guide 15j arranged in the head member 15h so that it may extend into and through the workpiece 2 and then through a guide (not seen) arranged in the lower arm for takeup onto a takeup device (not shown) on the machine 15 in a TW electroerosion machining operation. In the machining operation, a wire drive unit (not shown) is driven to advance the electrode 15i from the supply reel to axially more along a straight-line path established between the guides, thus linearly traveling through the workpiece 2. The operation of the wire drive unit is initiated and terminated in response to control commands from the NC unit 12.

Prior to initiation of the TW machining operation, the electrode 15i need be threaded through the workpiece 2 so that a programmed TW electroerosion along a prescribed path may properly begin at a prescribed start position interior of the workpiece 2. To this end, while it has been the conventional common practice for the operator to start with each prepared blank workpiece having a hole preformed at such a position, to manually load the workpiece on the TW machine and to manually thread the electrode or to have it automatically threaded through the preformed start hole, in the illustrated system according to the invention, not only is each workpiece 2 automatically loaded from the store 1 properly onto the TW machine 15 but the machine eliminates the need for such a preformed start hole. Thus, in the system shown, an electrode setting unit 15k is provided for both forming a start hole and threading the electrode 15i through this hole, in the workpiece 2 on the machine 15. The setting unit 15k, shown as mounted on the head member 15h, may be of the type basically shown and described in U.S. Pat. No. 4,379,959 to Kiyoshi Inoue.

The electrode setting unit 15k shown is designed to operate in response to control commands from the NC unit 12 and to operate in conjunction with the worktable 15a which is adapted for displacement in an X-Y plane by an X-axis motor 15l and a Y-axis 15m drivingly coupled with the worktable 15a. The motors 15l and 15m are driven by control commands from the NC unit 12 to displace the worktable 15a so that the prescribed start position in the workpiece 2 comes coincident with the straight-line path for the wire-type electrode 15i and directly below the free end of a forming electrode which may be the wire-type electrode itself or a separate slender electrode. Under control commands from the NC unit 12, electroerosive machining current is delivered from a machining power supply 15n (shown as accommodated inside the column 15f), a machining fluid (e.g. deionized water) is supplied from a supply unit 15p into a machining gap formed between the forming electrode and the workpiece 2 while the forming electrode is axially advanced to electroerosively form the hole at the prescribed start position in the workpiece 2. Advantageously, the forming electrode is constituted by or carries, the free end portion of the wire-type electrode 15i so that its threading through the hole can be carried out simultaneously with the formation of the hole in the workpiece 2 as described in the aforementioned patent. Then, the free end portion of the wire-type electrode is taken up onto the wire takeup device, thus completing the required threading operation.

The electrode setting operation described is followed by the TW machining operation again under control commands of the NC unit 12. The NC unit 12 acts on the power supply 15n to reset the machining energy, on the fluid supply 15p to readjust the pressure and flow rate of the machining fluid and on the machining feed drive 15l, 15m so that the workpiece 2 moves relative to the traveling wire-type electrode along a prescribed path such as to generate the required contour therein.

When the programmed TW operation is over, the fluid supply unit 15p acts under control commands from the NC unit 12 to drain the machining fluid in the worktank 15b. Under control commands from the NC unit 12, the wire setting unit 15k operates to break the wire-type electrode 15i to allow the broken half thereof extending onto the takeup unit to continue to be advanced by the wire drive unit for takeup on the takeup unit. Then, the mechanism 15c operates to open the worktank 15b as described and the work actuator 16 operates to project the piston 16c and to bring the disk head 16d into engagement with the pallet 3 in the worktank 15b. The disk head 16d is here designed to serve as the active member of an electromagnet contained therein. The electromagnet is energized to cause the pallet 3 to be magnetically attracted to the head disk 16d. The piston 16c is retracted into the cylinder 16c, thus carrying the pallet 3 loaded with the machined workpiece 2 onto the conveyer 6.

With the pallet 3 fixed in position between the guide member 13a and 13b on the conveyer 6, the motor 14 is operated under control commands of the NC unit 12 to turn the conveyer by a programmed angle such that the pallet 3 is brought in front of a blower 17 mounted on the round table 7. The blower 17 is operated by control commands from the NC unit to apply a blast of air to the workpiece 2 to remove the fluid residue which remains on the surfaces thereof.

Under further control commands from the NC unit 12 applied to the motor 14, the pallet 3 with the dried workpiece 2 is then brought in front of an actuator 18 on the round table 7 and adjacent a work inspection unit 19. The actuator 18 is basically of the same design as the actuators 16 and 11 and is operated under control commands from the NC unit 12 to slide the pallet 3 off the conveyer 6 onto the inspecting unit 19. The latter may be of weighing type. Thus, the unit 19 measures the weight of the machined workpiece 2 and determine if it has a predetermined weight indicating that it has a programmed contour generated therein. Depending on the determination, the unit 19 transmits to the NC unit 12 one of an OK signal representing acceptability of the machined workpiece and a NG signal representing unacceptability of the machined workpiece. The transmitted signal is memorized in the NC unit 12. After the inspection of the unit 19 is made, the actuator 18 again operates under control commands of the NC unit 12 to return the pallet 3 onto the conveyer 6. The motor 14 is operated under control commands of the NC unit 12 to cause the conveyer 6 to turn by one of the two programmed angles depending on which one of the OK and NG signal has been memorized in the NC unit 12. If the OK signal has been memorized, the conveyer 6 is moved to bring the pallet 3 in front of first further actuator 20 on the round table 7 and adjacent a first further conveyer 21. If the NG signal has been memorized, the conveyer 6 is moved to bring the pallet 3 in front of a second further actuator 22 on the round table 7 and adjacent a second further conveyer 23. The actuators 20 and 22 are basically of the same design as the actuators 11, 16 and 18 and operate under corresponding control commands from the NC unit to deliver the pallet 3 onto the conveyers 21 and 23, respectively. The conveyers 21 and 23 have their respective drive motors 24 and 25 which are designed to be driven in conjunction with the operations of the actuators 20 and 22 in response to the corresponding control commands from the NC unit 12. The NC unit 12 has associated therewith a data storage and selection unit 26 which has a storage of programmed numerical data which are transferred to the NC unit 12 for processing thereby to produce the control commands described.

What is claimed is:

1. A TW (traveling-wire) electroerosion system for machining a plurality of workpieces of different types required to acquire different contours, comprising:

a store adjacent a predetermined path and having a plurality of separate seats for storing unmachined workpieces of different types;

work dispensing means associated with said store and having a first set of operating units operable under control commands to successively dispense the different workpieces from the respective seats in a prescribed order onto said path having respective seats;

a TW machine located adjacent said path and having a second set of operating units operable under control commands for electroerosively machining each of the dispensed workpieces from said path by means of a traveling wire-type electrode, said TW machine having a tank defined by four walls angularly adjoining one another at right angles and including a frontal wall facing said path, and front wall moving means for moving said frontal wall out of a normal position thereof to allow a workpiece to be displaced from a respective seat of said path opposite said tank into said tank, and for moving said frontal wall back into said normal position;

electrode setting means associated with said machine and having a third set of operating units operable under control commands for machining a start hole and automatically threading the wire-type electrode therethrough in the workpiece to initiate the TW-electroerosion thereof;

work handling and transfer means having a fourth set of operating units operable under control commands for transferring the workpiece along said path, and loading the workpiece from the path onto said machine and unloading the workpiece from the machine onto said path when said frontal wall is out of said normal position; and control means connected with said first, second, third and fourth sets of operating units for operating said work dispensing means, said TW machine, said electrode setting means and said work handling and transfer means and connected to said front wall moving means for moving said frontal wall to sequentially execute the plurality of work processing operations which are equal in number to the number of the workpieces and, in each of the processing operations, for selecting a particular one of the workpieces from the corresponding seat in said store according to said prescribed order to dispense it onto said path, transferring the dispensed workpiece along said path, opening said tank by moving said frontal wall, loading said workpiece on said machine in said tank, closing said tank, positioning the loaded workpiece to establish therein relative to the axis of the wire-type electrode a particular position of the starting hole from which to start the TW-electroerosion, forming said start hole in the workpiece at said particular position and threading the wire-type electrode through said hole, axially advancing the threaded electrode, effecting relative displacement, while effecting stock removal, between the workpiece and the advancing electrode along a particular path programmed to generate the prescribed contour in said particular workpiece, and unloading the machined workpiece from said machine onto said path.

* * * * *